United States Patent
Hughes et al.

(10) Patent No.: US 10,187,142 B2
(45) Date of Patent: Jan. 22, 2019

(54) SCALABLE ARCHITECTURE FOR DIGITAL SIGNAL PROCESSING

(71) Applicant: AIRBUS DEFENCE AND SPACE LIMITED, Hertfordshire (GB)

(72) Inventors: Robert Hughes, Herfordshire (GB); Stephen Brown, Hertfordshire (GB)

(73) Assignee: AIRBUS DEFENCE AND SPACE LIMITED, Hartfordshire (GB)

( * ) Notice: Subject to any disclaimer, the term of this patent is extended or adjusted under 35 U.S.C. 154(b) by 0 days.

(21) Appl. No.: 15/509,174

(22) PCT Filed: Sep. 3, 2015

(86) PCT No.: PCT/GB2015/052547
§ 371 (c)(1),
(2) Date: Mar. 6, 2017

(87) PCT Pub. No.: WO2016/034883
PCT Pub. Date: Mar. 10, 2016

(65) Prior Publication Data
US 2017/0279521 A1 Sep. 28, 2017

(30) Foreign Application Priority Data
Sep. 4, 2014 (GB) .................................. 1415684.8

(51) Int. Cl.
*H04B 17/00* (2015.01)
*H04B 7/185* (2006.01)

(52) U.S. Cl.
CPC ......... *H04B 7/18515* (2013.01); *H04B 17/00* (2013.01)

(58) Field of Classification Search
CPC .... H04B 7/18515; H04B 1/001; H04B 10/40; H04B 7/2041; H04B 17/13; H04B 7/18571; H04B 7/18578; H04B 17/00
(Continued)

(56) References Cited

U.S. PATENT DOCUMENTS 5,790,529 A * 8/1998 Haber ................ H04B 7/18571
370/323
6,631,134 B1 * 10/2003 Zadikian ............. H04J 14/0227
370/252

(Continued)

FOREIGN PATENT DOCUMENTS

EP 2110967 A1 10/2009
EP 2728770 A2 5/2014
WO 2016034883 A1 3/2016

OTHER PUBLICATIONS

Opinion, dated Feb. 22, 2016.

*Primary Examiner* — Emmanuel Bayard
(74) *Attorney, Agent, or Firm* — Scarinci Hollenbeck

(57) ABSTRACT

Architecture is described for implementing digital signal processors, defined by a plurality of physically distinct processing modules connected by high speed digital interconnections in which a first plurality of first modules have a plurality of analog or digital signal inputs and arranged to perform a first set of digital processing functions and produce a first plurality of digital interconnection outputs, a second plurality of second modules are arranged to receive the first plurality of digital interconnection outputs and perform a second set of digital processing functions and produce a second plurality of digital interconnection outputs, and a third plurality of third modules are arranged to receive the second plurality of digital interconnection outputs and perform a third set of digital processing functions and produce a plurality of analog or digital signal outputs, wherein the architecture is scalable by selection of the number of first modules, the number of second modules and the number of third modules and the interconnections between them such that the signal processing required of a digital signal processor is achieved through the distribution (Continued)

of the processing over the combination of the selected numbers of first, second and third modules.

21 Claims, 9 Drawing Sheets

(58) Field of Classification Search
USPC .............................. 375/219–222, 224, 349
See application file for complete search history.

(56) References Cited

U.S. PATENT DOCUMENTS

| | | | |
|---|---|---|---|
| 6,898,235 B1* | 5/2005 | Carlin | H04B 1/001 |
| | | | 342/147 |
| 6,970,709 B1* | 11/2005 | Williams | H04W 88/08 |
| | | | 455/450 |
| 7,184,272 B1 | 2/2007 | Harlacher | |
| 7,675,985 B1* | 3/2010 | Watson | H04L 5/0044 |
| | | | 370/464 |
| 9,479,422 B2* | 10/2016 | Sundaresan | H04L 45/04 |
| 2004/0185775 A1* | 9/2004 | Bell | H04B 7/18515 |
| | | | 455/12.1 |
| 2010/0109928 A1* | 5/2010 | Chen | H04B 7/18515 |
| | | | 341/157 |
| 2010/0260198 A1* | 10/2010 | Rojas-Cessa | H04L 49/1515 |
| | | | 370/417 |
| 2012/0091799 A1* | 4/2012 | Rofougaran | H02J 1/10 |
| | | | 307/24 |
| 2012/0189084 A1* | 7/2012 | Yu | H04L 5/06 |
| | | | 375/340 |
| 2012/0319885 A1 | 12/2012 | Chang | |
| 2013/0155941 A1* | 6/2013 | Fujimura | H04J 1/05 |
| | | | 370/315 |
| 2014/0036765 A1* | 2/2014 | Fujimura | H04B 7/18515 |
| | | | 370/317 |
| 2015/0194145 A1* | 7/2015 | Chen | G06F 3/038 |
| | | | 345/156 |
| 2017/0214558 A1* | 7/2017 | Nazarathy | H04L 25/03891 |
| 2017/0238049 A1* | 8/2017 | Ramesh | H04N 21/4383 |
| | | | 725/126 |

* cited by examiner

SCALABLE ARCHITECTURE FOR DIGITAL SIGNAL PROCESSING

FIELD OF THE INVENTION

The present invention relates to an architecture for digital signal processing, and particularly, but not exclusively to a fully scalable architecture for on-board satellite digital signal processing.

BACKGROUND OF THE INVENTION

The use of on-board digital processing to provide real time signal processing is becoming increasingly widespread in satellites for telecommunications, Earth observation, science and navigation applications. Rapid advances in the underlying semiconductor technologies are bringing increasingly ambitious digital processing applications within the realms of feasibility.

A typical digital processing system used in a satellite is shown in FIG. 1. The system takes in a number $N_{in}$ of analogue signal inputs and generates a number $N_{out}$ of analogue output signals, managed by a control system with access to ground telecommand and telemetry links. The input signals must be digitized in order to be processed numerically and this involves a stage of analogue signal conditioning or "pre-processing" followed by analogue-to-digital (A/D) conversion. Similarly, generation of each output signal involves a stage of digital-to-analogue (D/A) conversion followed by analogue "post-processing".

Generation of each output signal in general requires information from any or all of the input signals, which means that the digital signal processing function does not decompose simply into what will be referred to as "horizontal slices" (in the sense of a horizontal pathway through the system diagram, representing a 1:1 mapping between an input and a respective output) or processing chains but must provide cross-connections between all inputs and outputs. Both input and output signals may be continuously active and therefore the digital signal processing must also be capable of operating continuously and in real time at a rate commensurate with the signal bandwidth. Increasing the scale of the system by adding more inputs and outputs increases the processing load proportionately but the amount of cross-connection required may increase more substantially, in some cases in proportion to the product $N_{in} \times N_{out}$.

Digital systems for use on board a spacecraft face additional challenges beyond those normally experienced by terrestrial systems, and consequently, the cost of qualification of new technology for space flight can be very high. A first necessity for the digital processor is to survive its journey into orbit, for which it must be enclosed in a suitable mechanical housing to withstand the severe vibration and shock levels experienced during launch. Once in orbit it must operate continuously and reliably for many years without maintenance. Stress relief measures must be implemented at all internal interfaces to ensure that sensitive electronic components and assemblies withstand all the mechanical stresses experienced within the satellite environment. The design must also cater for potentially large amounts of heat dissipated by the processor, which must be efficiently removed from the processor to maintain a safe operating temperature. This has to occur primarily by conduction through the metal housing since the on-board processor operates in a vacuum.

The most common engineering solution is to place the processor in a large metal box comprising a back-plane and a set of daughter cards. The box provides a strong mechanical structure, an interface to the spacecraft's thermal management systems and some shielding against ionizing radiation. The main processing components are located on the daughter cards, with interconnects between these occurring via the backplane. The printed circuit board technology used for both daughter cards and back-plane support high density tracks for interconnect, but the provision of suitably robust connectors and the cross-connection of large quantities of interconnect on the hack-plane are challenging. This cross-connection is particularly important for a digital channelizer and router, for example, whose main function is to provide a very high capacity interconnect with as much flexibility as possible between a large number of input and output ports. This implies a very large number of tracks which must cross each other and this can be difficult to manage within the two-dimensional confines of printed circuit board technology while maintaining signal integrity.

The principal disadvantage of the back-plane solution is that is not fully scalable and therefore not ideally optimised to all mission sizes. Specifically, the box and the back-plane printed circuit board must be re-designed and re-qualified for different mission sizes, or else the largest scale box must be used for all missions, which is inefficient within a severely mass-constrained payload.

For a satellite system such as an on-board digital channelizer, which processes uplink beam signals, separates out the wanted channels from interference, and rearranges and routes just the wanted channels for retransmission on appropriate downlink beams and frequencies, the number of cross-connections which are required is usually high. Accordingly, this can be difficult to achieve using a back-plane solution where all the interconnections must be routed within a printed circuit board. In order to be processed digitally, the radio frequency input signals are first filtered and down-converted in frequency to provide a band-limited signal suitable for analogue-to-digital conversion. Each signal corresponds to a relatively wide frequency band segment from an uplink beam (or antenna feed, in the case of an active receive antenna) and generally contains frequency multiplexes consisting of numerous carriers. Each input, after digitization by an A/D converter, is then divided into multiple narrowband channels by a digital channel demultiplexer. Channels may then be individually processed, typically including at least a gain control function, and routed to their destination downlink beams. Since the number of input and output beams is usually high, this routing function must be distributed across a network of switching components within the digital processor. On the output side, all of the channels destined for the same downlink beam are combined by a channel multiplexer to form a wideband signal which is then digital-to-analogue converted. Post-processing is then typically required to generate a suitable radio frequency signal for downlink transmission.

A further disadvantage of highly integrated processor designs, such as the back-plane solution housed in a single box, is that much of the testing can only be performed after the system has been fully assembled. This is an issue particularly for satellite payload equipment which must undergo rigorous environmental qualification testing in a fully representative mechanical and thermal configuration. Ideally such critical phase of testing should be performed earlier in a development programme, when the impact of rectifying any issues discovered is much lower.

There is therefore a need for an improved scaling technique which enables the high number of inputs, outputs and cross-connections typically required for a digital system such as a channelizer on board a spacecraft and which can support a phased integration and test programme.

SUMMARY OF THE INVENTION

According to an aspect of the present invention, there is provided architecture for implementing digital signal processors, defined by a plurality of physically distinct processing modules connected by high speed digital interconnections in which a first plurality of first modules have a plurality of analogue or digital signal inputs and arranged to perform a first set of digital processing functions and produce a first plurality of digital interconnection outputs, a second plurality of second modules are arranged to receive the first plurality of digital interconnection outputs and perform a second set of digital processing functions and produce a second plurality of digital interconnection outputs, and a third plurality of third modules are arranged to receive the second plurality of digital interconnection outputs and perform a third set of digital processing functions and produce a plurality of analogue or digital signal outputs, wherein the architecture is scalable by selection of the number of first modules, the number of second modules, the number of third modules and the interconnections between them such that the signal processing required of a digital signal processor is achieved through the distribution of the processing over the combination of the selected numbers of first, second and third modules.

According to another aspect of the present invention, there is provided a method of configuring a digital signal processor using architecture comprising a plurality of physically distinct processing modules connected by high speed digital interconnections to combine to perform the processing required of the digital signal processor, the method comprising arranging a first plurality of first modules, having a plurality of analogue or digital signal inputs, to perform a first set of digital processing functions and produce a first plurality of digital interconnection outputs, arranging a second plurality of second modules to receive the first plurality of digital interconnection outputs and perform a second set of digital processing functions and produce a second plurality of digital interconnection outputs, and arranging a third plurality of third modules to receive the second plurality of digital interconnection outputs and perform a third set of digital processing functions and produce a plurality of analogue or digital signal outputs, and scaling the architecture by selecting the number of first modules, the number of second modules and the number of third modules in accordance with the processing required of the digital signal processor.

According to another aspect of the present invention, there is provided a method of testing a digital signal processing using architecture comprising a plurality of physically distinct processing modules, connected by high speed digital interconnections to combine to perform the processing required of the digital signal processor, the method comprising a phased testing of individual modules or groups of modules, including environmental testing, before final testing of the full scale processor.

According to another aspect of the present invention, there is provided apparatus for digital signal processing within a satellite where the digital signal processing is distributed across a plurality of physically distinct digital processing modules which when connected by high speed digital interconnections combine together to perform the required signal processing, wherein a first group of a plurality of modules, each having a plurality of signal inputs, perform a first set of digital processing functions and produce a plurality of digital interconnection outputs, a second group with a plurality of modules in each group each having a plurality of digital inputs, perform a set of digital processing functions and produce a plurality of digital interconnection outputs, and a third group of a plurality of modules, each having a plurality of digital inputs, perform a final set of digital processing functions and produce a plurality of signal outputs, wherein the interconnections between modules are high-speed, serialised digital links.

By splitting the processing hardware into a set of physically distinct small modules, connected by high speed digital cables, each module is much smaller than a conventional on-board digital processor equipment but provides all of the required interfaces—including mechanical, thermal, power and control—needed to stand alone as an independent unit. The result is a fully scalable solution for real time processing of signals between any number of input and output ports, in which cross-connectivity between inputs and outputs is achieved by providing cable connections between stages of modules, which may be customised according to individual mission requirements.

The first modules may be arranged to process analogue input signals by performing at least one of: analogue-to-digital conversion, frequency conversion, amplification, filtering, combining, and splitting.

The third modules may be arranged to process analogue output signals by performing at least one of: digital-to-analogue conversion, frequency conversion, amplification, filtering, combining, and splitting.

Each of the modules may be electrically independent and each may have its own power supply. Each of the modules may be mechanically and thermally independent. As such, the modules may be easily interchanged without compromising the electrical, mechanical and thermal stability of the overall system. Additionally, modules may undergo environmental qualification testing individually or in small groups, before the full scale processor has been assembled.

The number of first modules, the number of second modules and the number of third modules may be selected so as to include system redundancy against failure through switching individual modules on or off, so that where the system is arranged in a satellite, for example, a long lifetime can be ensured, and exposure to radiation, for example, does not cause an overall system failure.

The high speed digital interconnections may be serial connections and may be electrical or optical methods of communication. The high speed ensures that a high number of inputs and outputs can be supported, which maximises applications, and improves performance within individual applications. For example, high capacity in a channelization system can be achieved by multiplexing a large number of narrow-band signals onto each high speed digital interconnection.

The first modules may have a plurality of digital interconnection inputs and the third modules have a plurality of digital interconnection outputs, which extends the signal flow operation of the present invention from unidirectional to bidirectional configurations.

The first modules may perform digital channelisation and a first stage of transparent routing on the input signals and the first digital interconnection output signals may represent channelised frequency bands of those signals.

The second modules may perform transparent routing of the channelised frequency bands.

The third modules may perform a final stage of transparent routing and digital recombination of the channelized frequency bands.

The second modules may perform digital beamforming of the channelised frequency bands on the digital input signals from an antenna to produce digital output signals representing beams.

The second modules may perform the regenerative functions of demodulation, decoding, encoding or modulation.

The digital processing function may be reprogrammable after manufacture, expanding the number of applications which are possible, and prolonging the useful lifetime of the processor.

Control messages may be routed along the high speed digital interconnections used to exchange signal data between modules.

Control messages may be conveyed to or from each module using dedicated control interfaces and means of distribution external to the modules.

The first modules and/or the second modules and/or the third modules may be arranged in a plurality of sub-groups representing different processing functions. The number of sub-groups and the number of modules within each sub-group can be scaled in order to achieve a particular digital processing function.

The processing modules may be adapted for mounting on a satellite.

BRIEF DESCRIPTION OF THE DRAWINGS

Embodiments of the present invention will be described by way of example only, in which.

DETAILED DESCRIPTION

Figure 2:
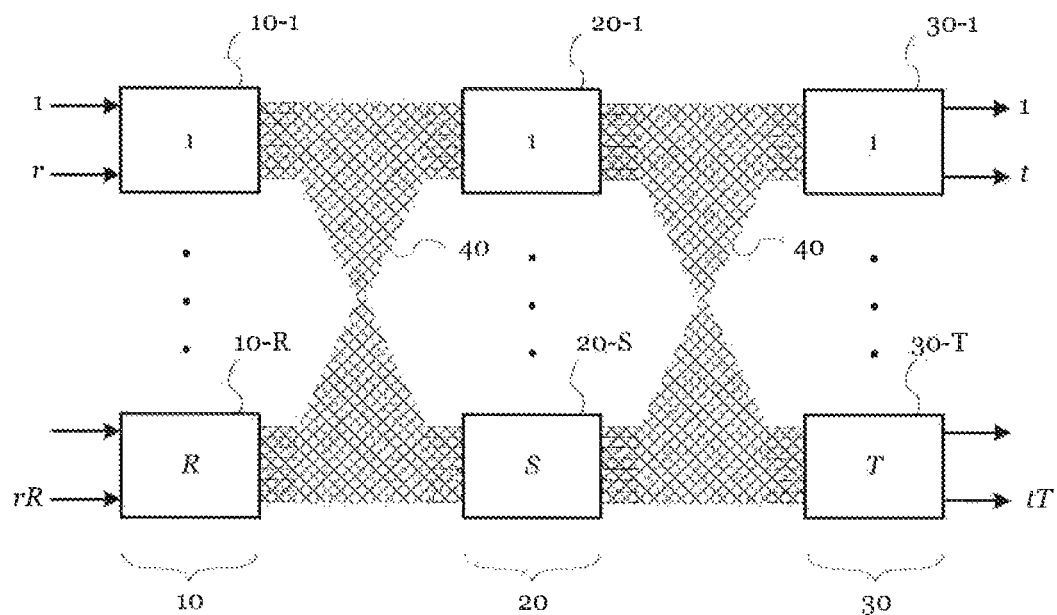
FIG. 2 illustrates three-stage architecture for a scalable processor according to an embodiment of the present invention.

According to a first embodiment of the present invention, architecture for an on-board digital processor comprises three stages of physically distinct small modules, connected by high speed digital cables, as shown in FIG. 2.

The first stage 10 of signal processing is implemented using a number of "input" modules 10-1 ... 10-R, of identical mechanical design, each of which accepts a number r of signal inputs and interfaces to other modules via a set of high speed digital interfaces using a cable harness 40. In the present embodiment, the input signals are analogue and A/D conversion is performed within the input modules 10.

Similarly, the third or final stage 30 of signal processing is implemented using a number of "output" modules 30-1 ... 30-T, of identical mechanical design, each of which interfaces to other modules via a set of high speed digital interfaces and generates a number t of signal outputs. In the present embodiment, the output signals are analogue and D/A conversion is performed within the output modules 30.

The second stage 20 of signal processing is performed in a number of "intermediate" modules 20-1 ... 20-S. These are equipped with high speed digital interfaces both to receive data from other modules 10 and to transmit data to other modules 30. Cables connecting the modules use a cable harness 40. The same format is used for the high speed digital interfaces on all module types (i.e. modules in each of the first, second and third stages 10, 20, 30), to allow interconnection between modules in any configuration supported by the number of such interfaces implemented in the realisation of the module designs. Thus it is possible to construct systems with any number of stages of intermediate modules.

In order to minimise the number of cable connections in the present embodiment, a high speed serial digital format is used, using electrical interconnection standards supporting data throughput of many Gigabits per second over, for example, a twisted pair of copper cables. Drivers and receivers for such links are provided as standard on many signal processing components. The term "high speed" may be construed as relating to a data rate of a particular order of magnitude, rather than specifying an exact speed, and in the present disclosure, that order of magnitude is a speed of Gbit/sec or greater.

The embodiment of FIG. 2 contains R input modules 10, S intermediate modules 20 and T output modules 30, with data flowing unidirectionally from input (left) to output (right), are shown. An immediate advantage of the current invention compared to prior art is that the number of inputs is independent of the number of outputs, which are determined by choice of the independent parameters R and T. The number r of signal inputs on each input module 10-1 ... 10-R and the number t of signal outputs on each output module 30-1 ... 30-T are fixed for a given realisation of the modules in each stage of the processor, and these parameters are chosen with suitably small values to allow a reasonably close match to any given mission scale requirement, while ensuring an efficient implementation. The amount of a processing resource can also be independently varied by choice of the parameter S. The data capacity routed between any pair of modules can also be independently varied by the number of cable interconnections provided. Should the required signal processing function outstrip the capacity of the modules arranged in a three stage architecture then more stages can be added to expand the processing resources indefinitely.

It will be appreciated that a number of variations of the first embodiment fall within the scope of the invention. Most generally, the signal processing functions within each module may be fixed, for example using application-specific integrated circuit (ASIC) technology, which generally offers the best efficiency in terms of performance to power dissipation ratio and is therefore commonly used in satellite applications where power is at a premium. Alternatively, the signal processing may be implemented in reprogrammable technology which allows the signal processing function to be modified for specific missions or even during operation of an individual mission. The present invention permits either realisation to be employed for any of the module types. Moreover, by maintaining a common digital interface standard irrespective of the internal signal processing realisation, fixed and reconfigurable module implementations can be used in any combination to provide extremely flexible signal processing functions.

In the first embodiment, the A/D conversion is performed in the input modules 10, and the D/A conversion is performed in the output modules 30. As an alternative, A/D conversion may be performed prior to the input modules 10, in which case the input modules 10 accept digital signals. Similarly, the D/A conversion may be performed subsequent to the output modules 30, in which case the output modules 30 output digital signals. Depending on the specific configuration used, some or all analogue pre-processing, and some or all of analogue post-processing may be performed in the input 10 and output modules 30 respectively, or may be performed prior to the input modules 10 and subsequent to the output modules 30.

Electrical interconnects are described, but it is also possible to achieve the required data transmission rates using optical fibre interconnections, with the addition of suitable optoelectronic transducers at either end of the link.

Whichever interconnect type is used, since the same format is used for all module types, interconnection between modules is possible in any configuration supported by the number of such interfaces implemented in the realisation of the module designs. Thus it is possible to construct systems with any number of stages of intermediate modules, including zero, in which the input modules are directly connected to the output modules.

Although unidirectional signal flow, typically from input to output, stage by stage, has been described, the present invention does not preclude more complex signal flows, dependent on the particular interconnections used. In particular, the input modules may be equipped with a number of high speed digital inputs as well as outputs and the output modules may be equipped with a number of high speed digital outputs as well as inputs in order to support more general signal flows. This will be described in greater detail below.

Another key requirement for on-board satellite applications is reliable operation over many years. This is usually met by the provision of additional redundant units which are switched in as replacements in the event of failure of one of the primary units. The arrangement of modules in FIG. 2 is amenable to the addition of any number of redundant units by a simple over-sizing of the interconnection network. Some embodiments of the present invention include the provision of a power supply in each module, with an external failsafe interface to the spacecraft primary power bus, to handle generation and distribution of all internal supplies required by the module components. This allows each module to be powered on or off independently of the other modules. Failed modules can be routed around using spare cable connections to spare modules provided for such purpose in the oversized network, and this may occur dynamically, as part of a manual reconfiguration on the ground, or as part of a remote reconfiguration controlled via telecommands where the modules are housed on a satellite, for example.

Having selected a particular configuration of the architecture of the invention for a particular digital processing function, it is possible to reconfigure the processing function after the manufacture of the initial configuration, through rerouting of signals, and remote reconfiguration of the architecture. This may be achieved in a similar manner to adapting the system in the event of failure of a module, remotely enabling or disabling certain modules, for example, or issuing reprogramming commands to the processors of specific modules. Conventionally, this would have involved costly and complex redesign work due to the need to service a larger processor component than the small-scale modules of the architecture of the present invention.

On-board signal processors generally require configuration and monitoring support which is channeled via a spacecraft control interface that ultimately exchanges telecommand and telemetry messages with a controller on the ground. As a minimum, each module should provide a local control interface for configuration and monitoring purposes. With this minimum provision an external control network is required to connect together all of the local control signals for a processor distributed across multiple modules.

To reduce the external overhead, embodiments of the present invention also include provision to exchange control and synchronisation messages over the high speed digital interfaces, sharing this interconnection with data. Combined with a router function in each module that allows control and synchronisation messages to be routed between at least a subset of the high speed digital interfaces, this allows flexible control networks to be built matching any scale of processor without additional hardware beyond that contained in the modules and the cable interconnections. Oversizing of the control network for redundancy, as with the main signal processing function, allows inactive modules (e.g. modules which are switched off) to be routed around while still maintaining full control connectivity to all active modules.

Figure 3:
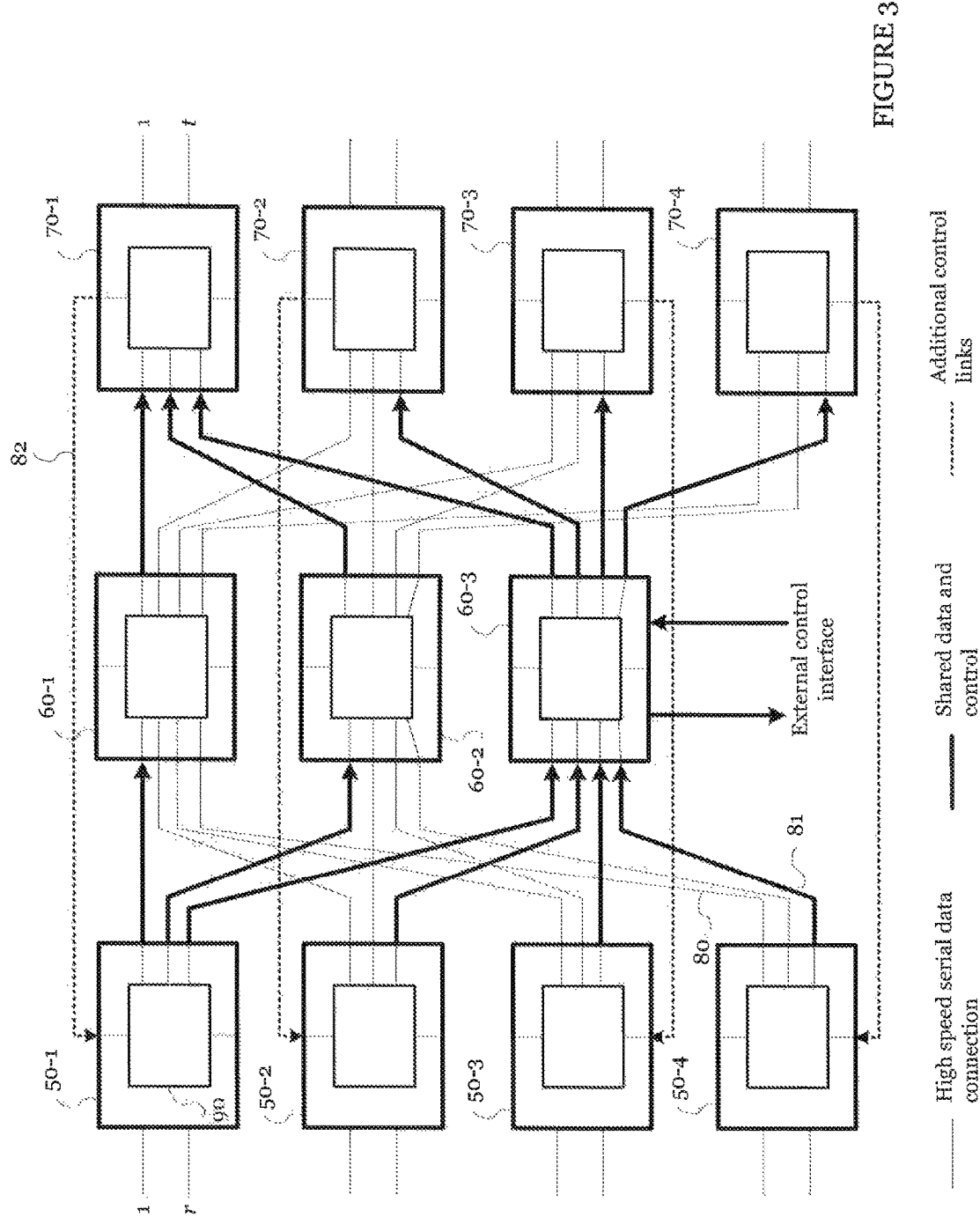
FIG. 3 illustrates the control architecture used in an embodiment of the present invention.

FIG. 3 shows an example of how this might be achieved for a three stage processor according to an embodiment of the present invention, of the type shown in FIG. 2, comprising four input Modules 50-1, 50-2, 50-3, 50-4 (R=4), three intermediate modules 60-1, 60-2, 60-3 forming an intermediate stage (S=3) and four output modules 70-1, 70-2, 70-3, 70-4 (T=4). Data flow between the modules is configured by a suitable design of cable harness to be unidirectional from input to output with at least one connection from each module in one stage to each module in the next.

High speed serial data connections 80 between modules are shown in FIG. 3, but in this example it is possible to provide a large proportion of the control connectivity required to access all of the modules via an external control interface by making use of existing data connections 81, shown in FIG. 3 using thicker lines, representing shared data/control links. One of the modules is connected to the external control interface for telecommand or telemetry. Since each module is equipped with an external control interface, this could be any of the modules but one of the intermediate (also referred to hereinafter as a "middle") rank modules 60-3 is shown as connected to the control interface in FIG. 3. The term "rank" groups modules which are the same logical distance, in terms of the number of other modules included in a signal path, from an input and/or output. Such sub-groups, [50-1, 50-2, 50-3], [60-1, 60-2, 60-3], [70-1, 70-2, 70-3] may be associated with a particular processing function, for example, as described below.

Control network routers 90 in each module allow control messages to be passed around the subset of active connections forming the control network. In the example shown, it is not possible to get two-way communication between all modules without adding some additional connections solely for control and synchronisation messages because the data flow for the interconnections is unidirectional. A possible arrangement for these extra control connections is depicted via dotted lines 82 in FIG. 3. With a relatively small number of additional cables it is thus possible to form looped control paths allowing both read and write access to every module via the external control interface. For redundancy purposes it would be normal to supply spare external control interfaces and provide additional spare cabling to ensure reliable operation even after the failure of one or more modules.

It should be noted that many possible topologies can be implemented and the control network can be implemented "internally" via shared data interconnections, "externally" via a network using the standard control interfaces on each module, or by a mixture of both. It should also be noted that provision for high speed digital interconnections on all module types, including input and output modules, includes quantities of both input and output connections. Thus the connectivity between modules is not restricted to be unidirectional and two-way connections can also be used to simplify the control network when desired.

The high degree of independence between modules and a common interface standard allow the accommodation of almost arbitrary configurations on board a spacecraft. As described above, each module is mechanically, thermally and electrically independent and also self-sufficient in terms of control functions. The modules can thus be regarded as "standalone" modules. This degree of isolation is made possible by the use of high speed serial cable interconnections between modules, which enables a potentially high number of modules to be used without excessive cabling, suitable, for example, for a high capacity digital channelizer. Of course, variants of this architecture are possible in which modules are grouped, trading off flexibility for some other advantage. For example it is possible to share one power supply between multiple modules to obtain an efficiency saving in mass or power. It is also possible to group modules mechanically, for example by affixing numbers of them to a common baseplate before mounting them within the payload. These modifications of the described embodiments are considered to fall within the scope of the invention.

Figure 4:
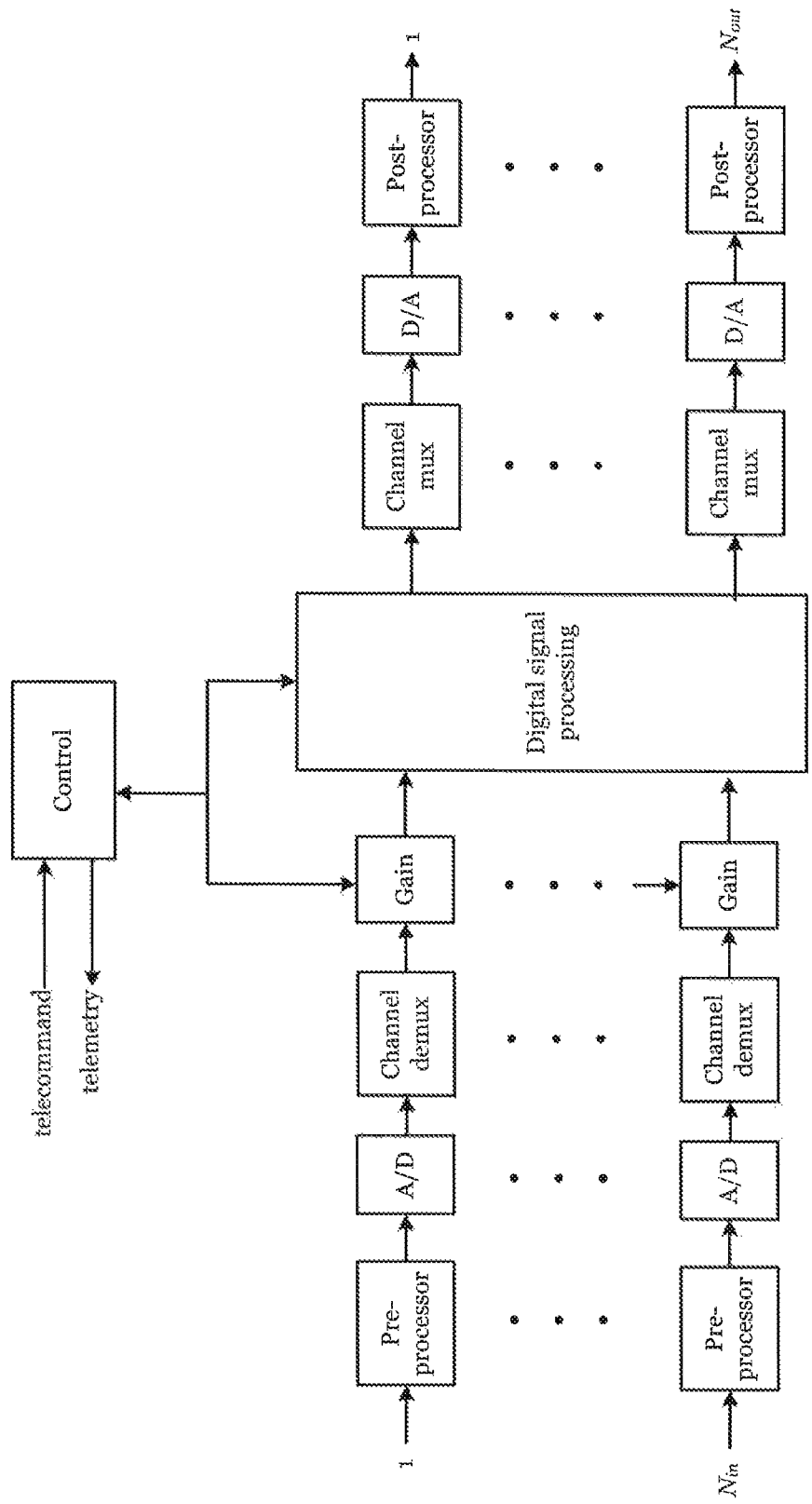
FIG. 4 illustrates an example of the structure of a digital channelizer.
Figure 5:
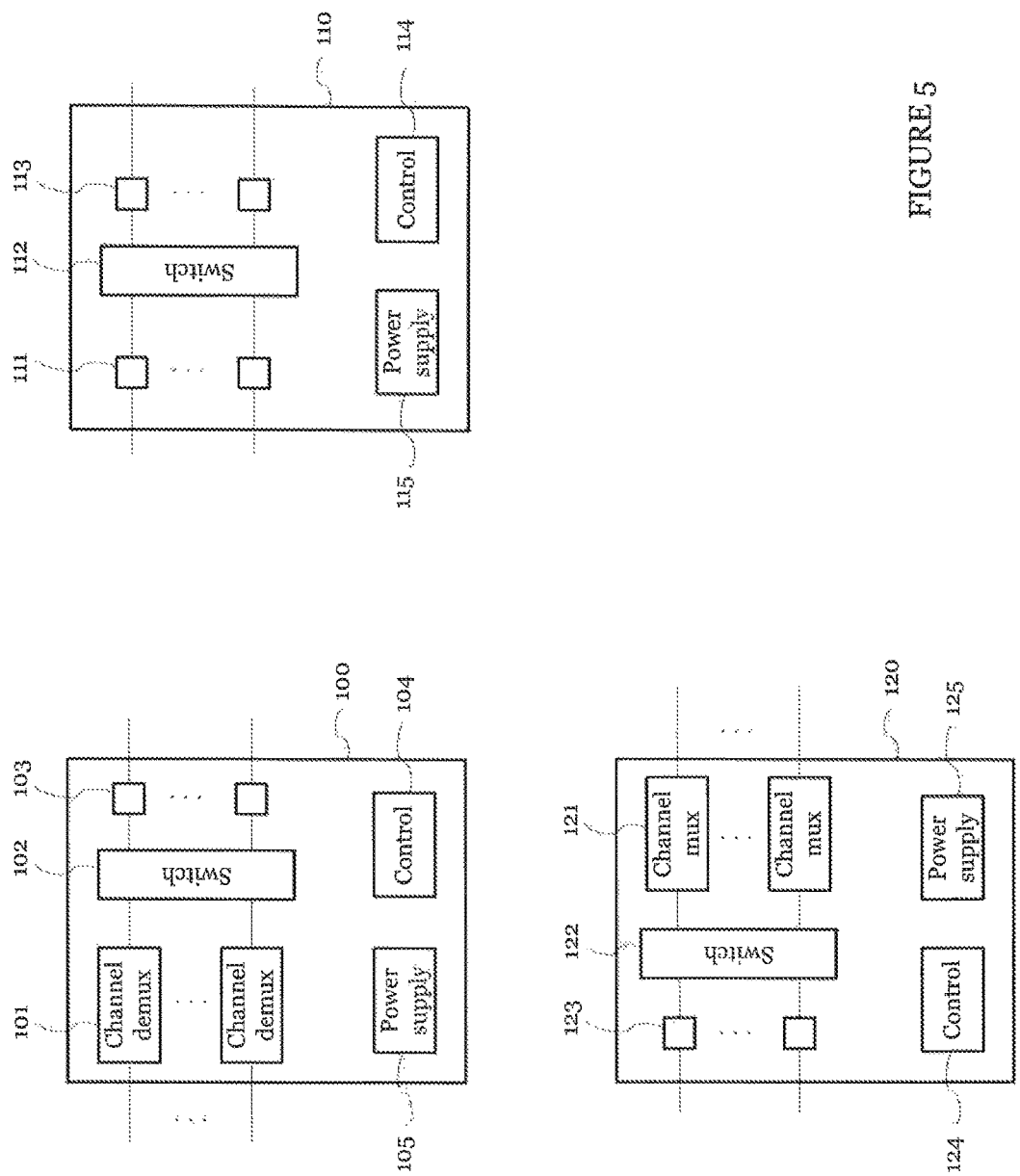
FIG. 5 illustrates minimal sets of functions of input, digital and output modules used in digital channelizer embodiments of the present invention.

To implement a scalable digital channelizer and router using these modules, for example, it is necessary to include at least a minimum set of functions on each of the input, digital and output modules as shown in FIG. 5, although the particular functions included will depend on the overall system to be constructed using the architecture of the present invention. To enhance understanding of the operation of a channelizer, in the context of which the subsequent embodiments are described, the functions of a channelizer are shown in FIG. 4.

Figure 1:
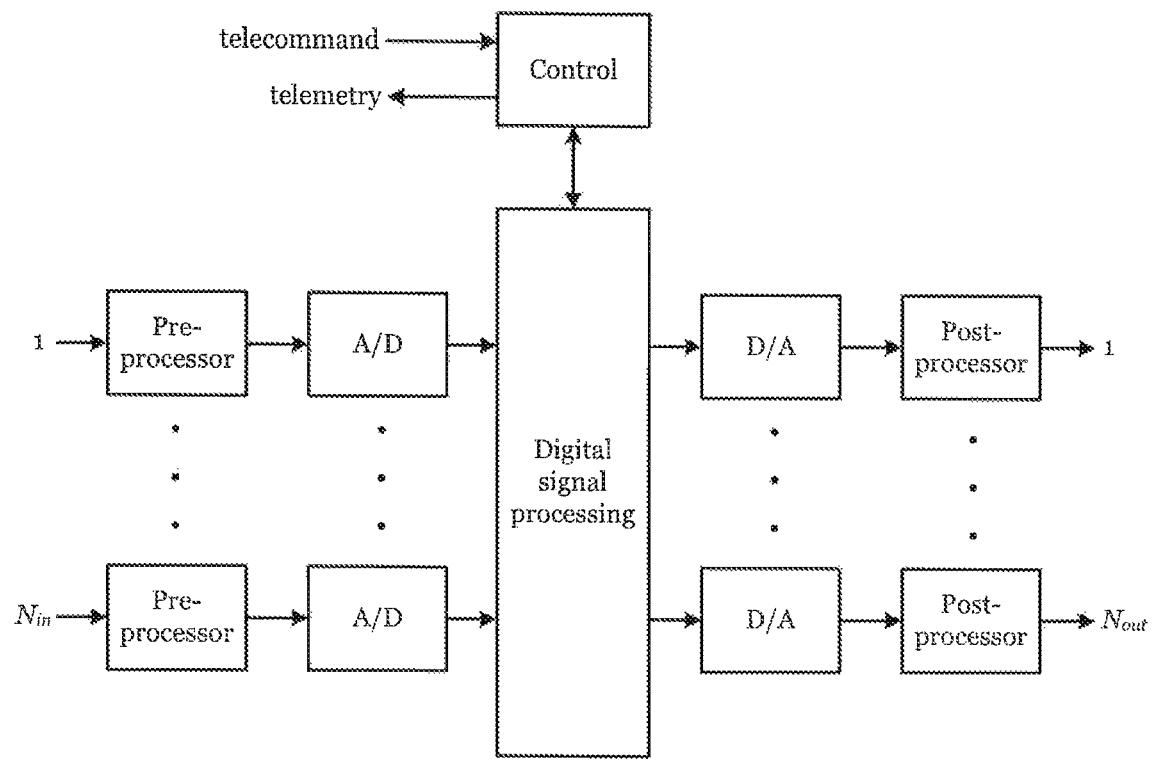
FIG. 1 illustrates an example of on-board satellite digital processor functions.

In order to be processed digitally, radio frequency input signals are first filtered and down-converted in frequency to provide a band-limited signal suitable for analogue-to-digital conversion. Each signal corresponds to a relatively wide frequency band segment from an uplink beam (or antenna feed, in the case of an active receive antenna) and generally contains frequency multiplexes consisting of numerous carriers. Each input, after digitization by an A/D converter, is then divided into multiple narrowband channels by a digital channel demultiplexer. Channels may then be individually processed, typically including at least a gain control function, and routed to their destination downlink beams. Since the number of input and output beams is usually high, this routing function must be distributed across a network of switching components within the digital processor. On the output side, all of the channels destined for the same downlink beam are combined by a channel multiplexer to form a wideband signal which is then digital-to-analogue converted. Post-processing (frequency up-conversion and filtering) is then typically required to generate a suitable radio frequency signal for downlink transmission. Additional processing can also be added to the channelizer to increase the benefits of the digital processor, such as power monitoring, amplitude and phase weighting for digital beam-forming, compensation for gain non-flatness and group delay variations. Additional stages for demodulation, decoding, re-encoding and modulation can also be added to build a regenerative on-board processor as set out in more detail below. The outer layers of channel processing are used to separate the individual carriers for regeneration and to recombine them to form suitable outputs and in general still conform to the architecture shown in FIG. 1.

In the architecture of the present invention, the input modules implement the front end processing, including channelization and a first stage of switching for transparent routing. The number R of such modules is selected according to the total number of inputs required for a particular mission. FIG. 5 illustrates a representative input module 100, containing a number of channel demultiplexers 101 in each of the input paths. The channel outputs from the r demultiplexers in general require a first stage of switching within the module 100 to support flexible end-to-end channel routing, performed by switch 102. Other functions, such as gain control, A/D conversion and additional analogue pre-processing may also be included within each input module 100. High speed digital serial interface logic 103 is illustrated in each signal path following the switch, which may include input as well as output interfaces to support general signal flow topologies. Overall control of the input module 100 is performed by a control module 104, powered by power supply 105. The control module and power supply render the input module self-sufficient as a standalone module.

Output processing consists of essentially the reverse process, performed by a number T of output modules for back end signal processing, each with internal switching for transparent routing and channel multiplexers to recombine channelized frequency bands to generate t output signals suitable for downlink transmission. Again, further functions such as gain control, D/A conversion and additional post-processing may be included within each output module in alternative embodiments of the present invention. FIG. 5 illustrates a representative output module 120 containing high speed digital serial interface logic 123, a switch 122, channel multiplexers 121, control 124 and a power supply 125. As with the input module 100, the output module 120 can operate as a standalone module.

Routing is implemented with S intermediate modules, linked to a control mechanism. Representative intermediate modules no are shown in FIG. 5, containing high speed serial digital interface logic for inputs (111) and outputs (113). Routing is performed using switch 112. Power is provided from power supply 115, and control is performed the control module 114.

Interconnection between all of the inputs and outputs is provided with the aid of intermediate modules to implement, as a minimum, switching between channelized data carried between numbers of input and output high speed digital interconnections. The digital links require serialisation/deserialisation (SERDES) logic 103, 111, 113, 123. The switching modules are typically arranged into ranks but this is not a requirement and any topology can be used for interconnections including loops if so desired. The switching modules can also be reprogrammable and be augmented by including general-purpose processing elements in some embodiments, for additional filtering or signal monitoring, for example.

Figure 6:
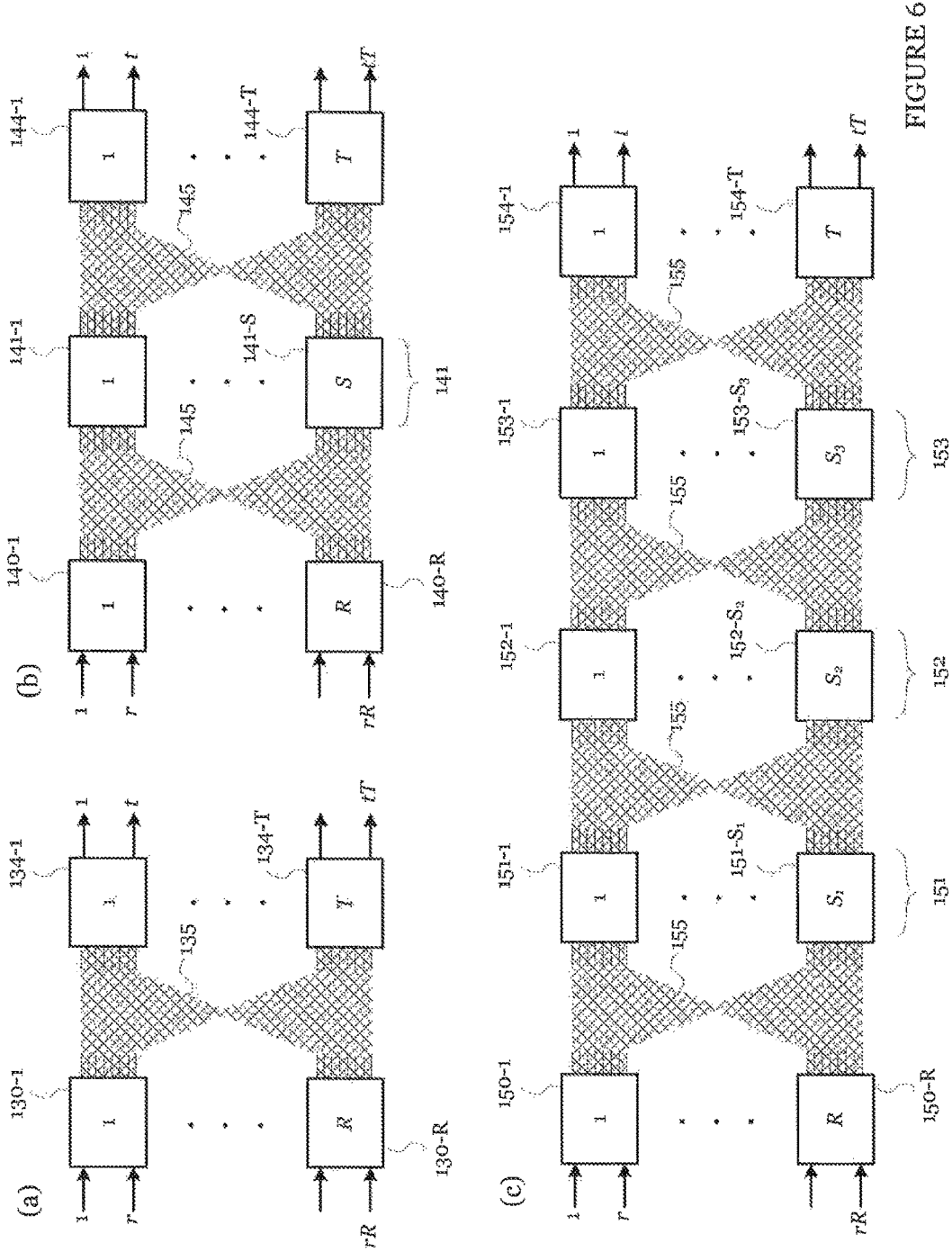
FIG. 6 illustrates example configurations of digital channelizer, according to embodiments of the present invention.

Examples are shown in FIG. 6 with one intermediate rank 141 of cross-connected intermediate modules 141-1 . . . 141-S for switching, suitable for moderate scale missions, shown in FIG. 6(b), with input modules 140-1 . . . 140-R each having r inputs and output modules 144-1 . . . 144-T each having t outputs connected to the intermediate rank via cable harnesses 145. Three intermediate ranks 151, 152, 153 are shown in FIG. 6(c), suitable for large scale missions, where input modules 150-1 . . . 150-R and output modules 154-1 . . . 154-T are connected via cable harnesses 155 to a first rank of intermediate modules 151-1 . . . 151-$S_1$, a second rank of intermediate modules 152-1 . . . 152-$S_2$ and a third rank of intermediate modules 153-1 . . . 153-$S_3$. The number of ranks may be extended arbitrarily until the limits of payload accommodation are reached. The case of zero intermediate switching ranks is also admissible as shown in FIG. 6(a), were only input modules 130-1 . . . 130-R and output modules 134-1 . . . 134-T are shown, connected via cable harness 135, and this arrangement is suitable for small scale missions using the switching capacity intrinsic to input and output modules. In the arrangements of FIG. 6, the input modules perform channel demultiplexing and switching, based on input module 100 of FIG. 5, the intermediate modules perform routing, based on intermediate module 110 of FIG. 5, and the output modules perform channel multiplexing and switching, based on the output module 120 of FIG. 5.

The numbers of each module type can be tailored freely to suit any digital channelizer mission size in step sizes of r inputs and t outputs. The values of r and t are fixed in the module designs with sufficiently small values that it is possible to get very close to any scale requirement with little inefficiency in terms of unnecessary hardware. The number of switching intermediate modules can be varied according to the capacity required and the flexibility of routing. The number of module interconnections can also be varied by adding or removing cable connections within the switch network formed by the intermediate modules. Additional connections within a switch network can improve flexibility, for example, by reducing the number of rearrangements needed during operation to accommodate additional traffic channels or to support more multi-cast traffic routing scenarios. Unnecessary cable connections can also be removed, allowing missions with less demanding requirements to take benefit in reduced mass and power.

The principle advantage of this solution is that any on-board digital channelizer can be implemented using three standardised module designs that can be reused with no re-design or re-qualification needed between missions of differing scale other than the cable harness. In contrast to solutions in which the overall processor is partitioned into end-to-end slices, embodiments of the present invention allow efficient implementation of systems with unequal numbers of inputs and outputs. This is desirable because on-board channelizers filter out unwanted signals, generating fewer outputs than inputs, or they multi-cast signals to several outputs, increasing the output side capacity, or to suit a variety of antenna, payload or system requirements. Additionally, the implementation of the complex connectivity required for high capacity switch networks is much simpler using cables than printed circuit board technology. The three dimensions available for cable routing provide plenty of scope to accommodate even the largest missions whereas the limited number of cross-overs that can be achieved in two-dimensional printed circuit board technology, such as that used in back-plane solutions, may seriously constrain the routing flexibility for larger scale processors.

The architecture of FIG. 6(b), and its extensions to larger switch networks comprising more ranks, is compatible with a digital beam-forming solution in which one or more intermediate ranks of modules is used to perform either receive or transmit narrowband digital beam-forming with each module handling a subset of frequency channels from all of the antenna feed signals. To implement this in the present invention it is only necessary to supplement the switch function on the intermediate module used in the digital channelizer with the amplitude and phase weightings, accumulations and rearrangements required for digital beam-forming. This can be done by augmentation, reprogramming or replacement of processing components on the intermediate module without other alteration to the hardware. The intermediate module can therefore be extended to serve as a dual mode switch/beamformer module. It will be appreciated, however, that other extensions will be apparent on reading the present disclosure.

Figure 7:
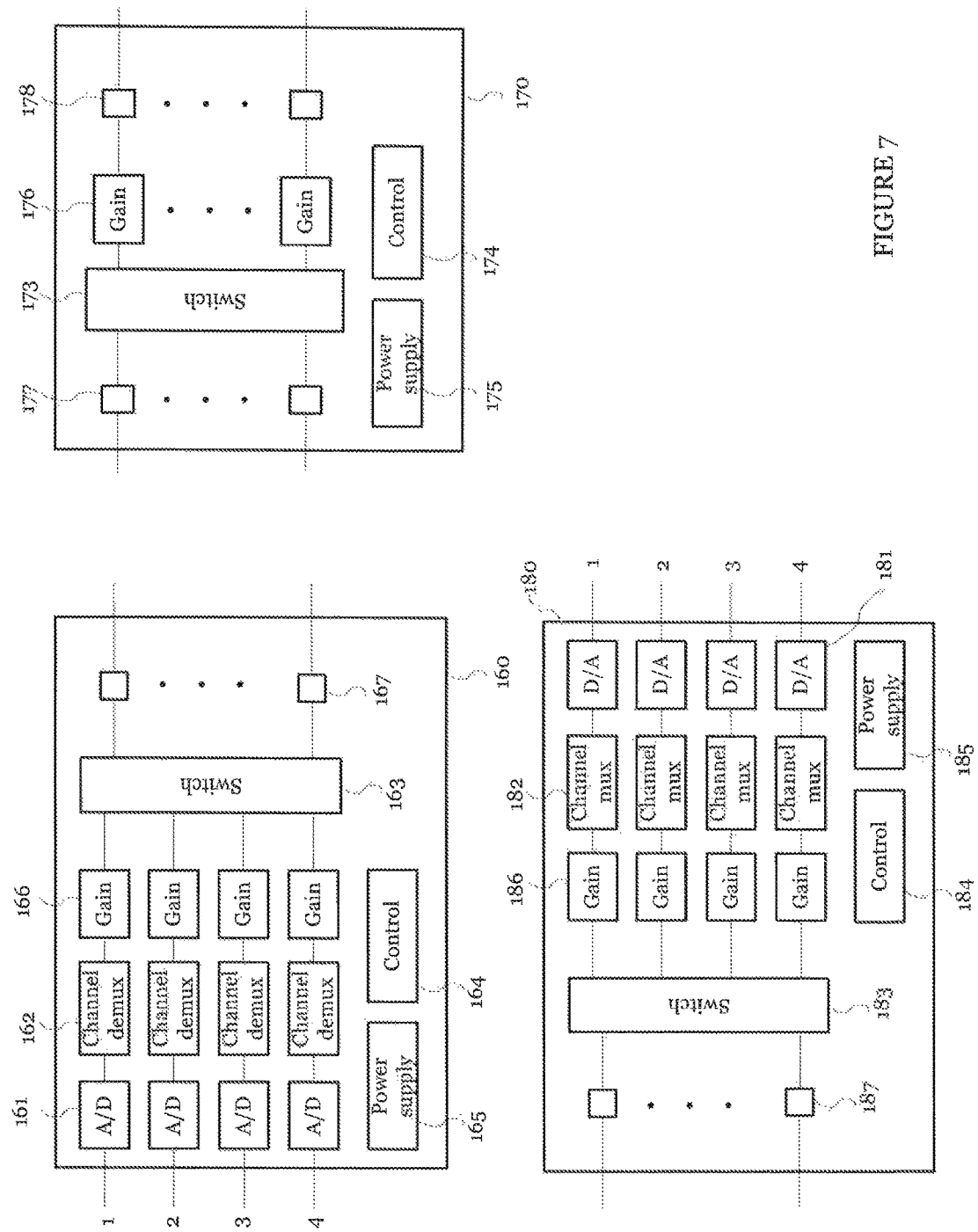
FIG. 7 illustrates the configuration of receive, switch and transmit modules according to an embodiment of the present invention.

A specific example of use of the architecture of FIG. 5, as an embodiment of the present invention, is shown in FIG. 7 with r=t=4, with the inclusion of integral power supplies 165, 175, 185 and control functions 164, 174, 184, a gain stage 166, 176, 186 in each module, A/D converters 161 and channel demultiplexers 162 in each input path of the input modules 160 and D/A converters 181 and channel multiplexers 182 in each output path of the output modules 180. In the context of a channelizer, the input modules may be regarded as receive modules, the intermediate modules as switching modules, and the output modules and transmit modules. The input modules 160 comprise a switch 163, followed by SERDES logic 167 before the output of the module, while the output modules 180 comprise SERDES logic 187 at the module input, followed by a switch 183. The intermediate modules 170 comprise SERDES logic 177, 178 either side of the routing switch 173.

Implementations of digital channelizing processors for use on board satellites typically use application-specific integrated circuits (ASICs) as the main processing components for their superior radiation hardness and power efficiency but the designs are hardwired and their function cannot therefore be subsequently modified. Alternatively, reprogrammable components such as field programmable gate arrays (FPGAs), microprocessors or programmable digital signal processing (DSP) chips can be used. These components have relatively higher power dissipation for a given processing performance but can be re-programmed subsequently to manufacture.

The architecture of the present invention is not reliant on the choice of one or other and in fact can support either within the same physical module. This allows large scale processors to be implemented with maximum efficiency using ASIC components and smaller processors to be implemented more rapidly using reprogrammable components, and is a demonstration of the flexibility of the present invention.

Replacement of ASIC with reprogrammable components such as FPGAs may require modification of the internal design of the module but, since all of components including the power supply are internal to each module, as shown in FIG. 7, for example, the external module interfaces remain identical. As a consequence, it is straightforward to support mixed architectures by implementing a subset of the modules using reprogrammable components such as FPGAs. This can be used, for example, to incorporate additional specialised processing functions into the middle of the processing chain or to provide alternative channelizer characteristics in the receive and transmit modules.

An on-board signal processing application which benefits particularly from reprogrammable technology is regenerative processing for satellite telecommunications. Regeneration of the uplinked data involves demodulation of individual carrier signals in the processor and the ability to update the on-board modem functions, and is desirable to keep pace with ground terminal evolution over the lifetime of the satellite. "Regenerative processing" refers to the fact that original information contained within a signal is "regenerated" and processed, in contrast to "transparent processing" which involves processing a particular signal without the processor having a knowledge of the information contained in the signal.

Figure 8:
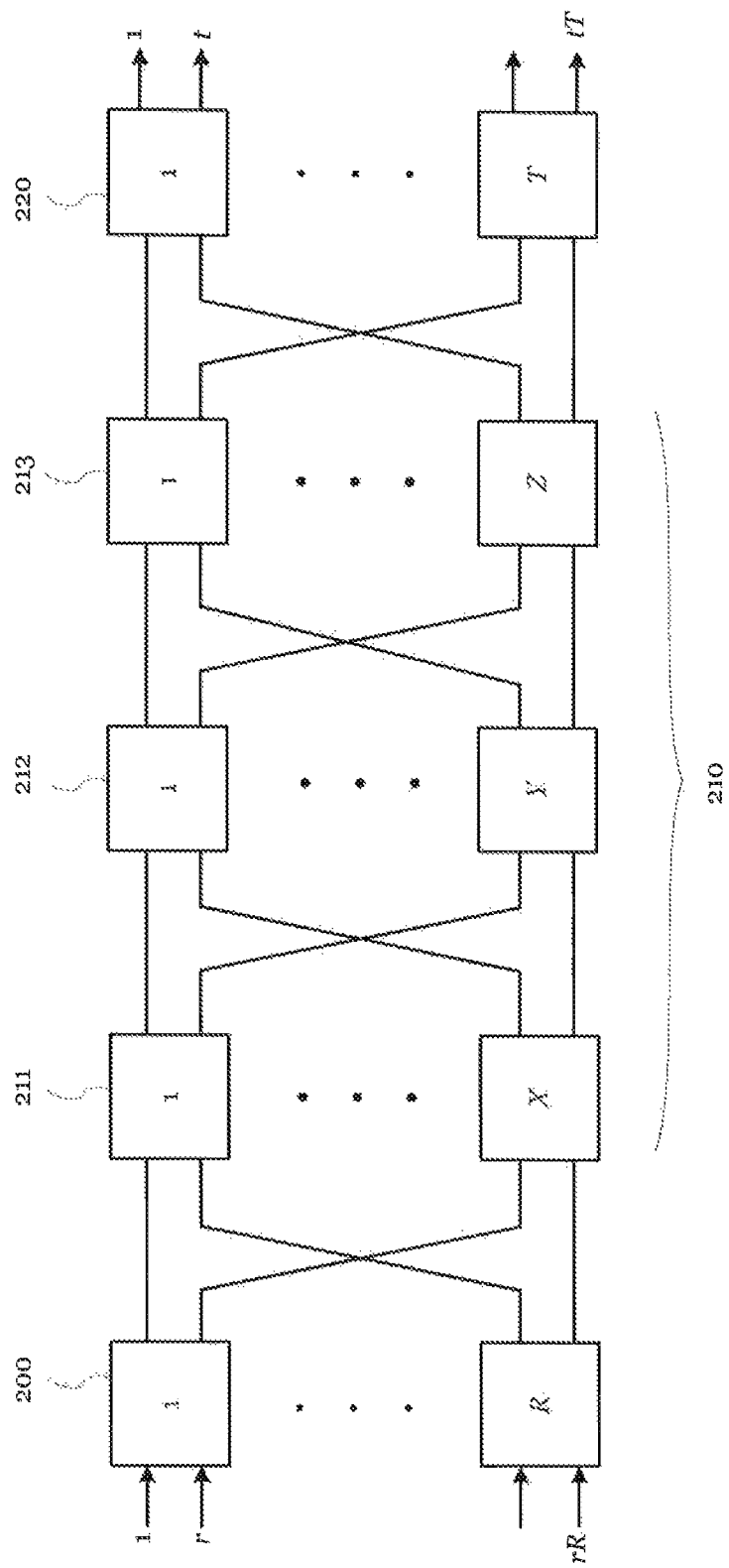
FIG. 8 illustrates a system employing fully regenerative processing according to an embodiment of the present invention.

Channelization and routing functions similar to those of the digital channelizer are typically used at the front end of the digital processing chain to select and isolate specific carrier signals for demodulation. FIG. 8 shows how all of the functions required of a typical end-to-end regenerative processor could be constructed using the architecture of the present invention by using reconfigurable logic versions of the intermediate modules 210 to implement the regenerative functions. The intermediate modules may comprise a first rank 211 of X modules for demodulation and decoding, a second rank 212 of Y modules for packet routing, and a third rank 213 of Z, modules for modulation and encoding. The R input 200 and T output 220 modules are reused to connect the front and end of each chain with as many intermediate modules as required in between to implement the regenerative functions. The input and output modules can be implemented using either fixed or reconfigurable logic as appropriate.

Figure 9A:
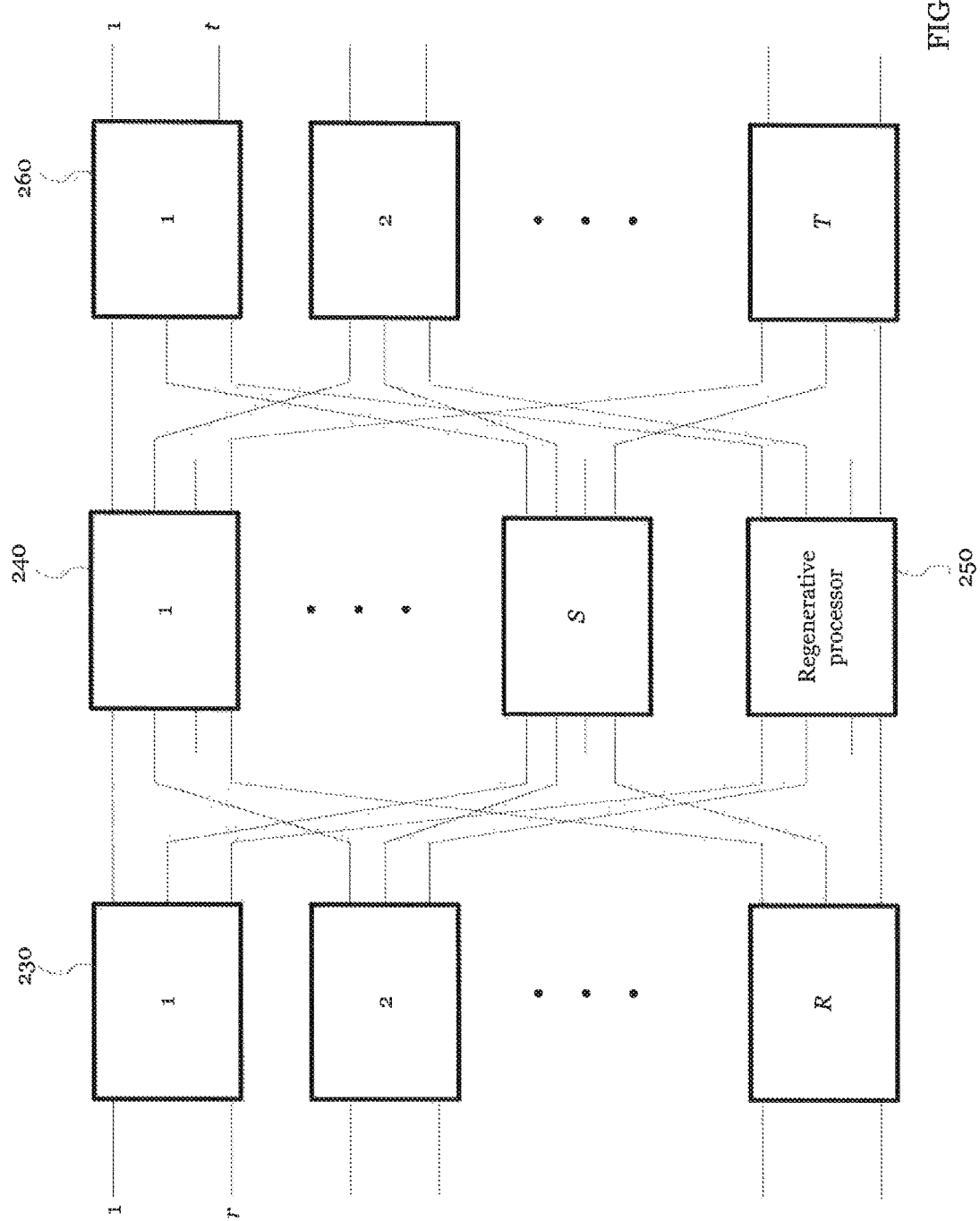
FIG. 9 illustrates systems employing partially regenerative processing according to embodiments of the present invention.

Since regenerative functions require much more processing than transparent functions, and are therefore expensive to implement on board, hybrid solutions performing predominantly transparent processing with only a subset of traffic undergoing regenerative processing may be optimal. The architecture of the present invention is capable of supporting numerous variations of this type of architecture. Two examples are given in FIG. 9, representing embodiments of the present invention. The first, shown in FIG. 9(a), is the simplest, requiring just the replacement of one or more centre rank intermediate modules from the architecture of FIG. 6(b) with the reconfigurable version. This architecture could be used to implement a small number of modems on a single module. The connections to each receive and transmit module allow the regenerated channels to be selected from any of the uplinks and inserted on any of the downlinks, making use of the routing functions within those modules. The embodiment of FIG. 9(a) contains R input modules 230, S intermediate modules 240, a regenerative processor 250 in the intermediate rank, and T output modules 260.

Figure 9B:
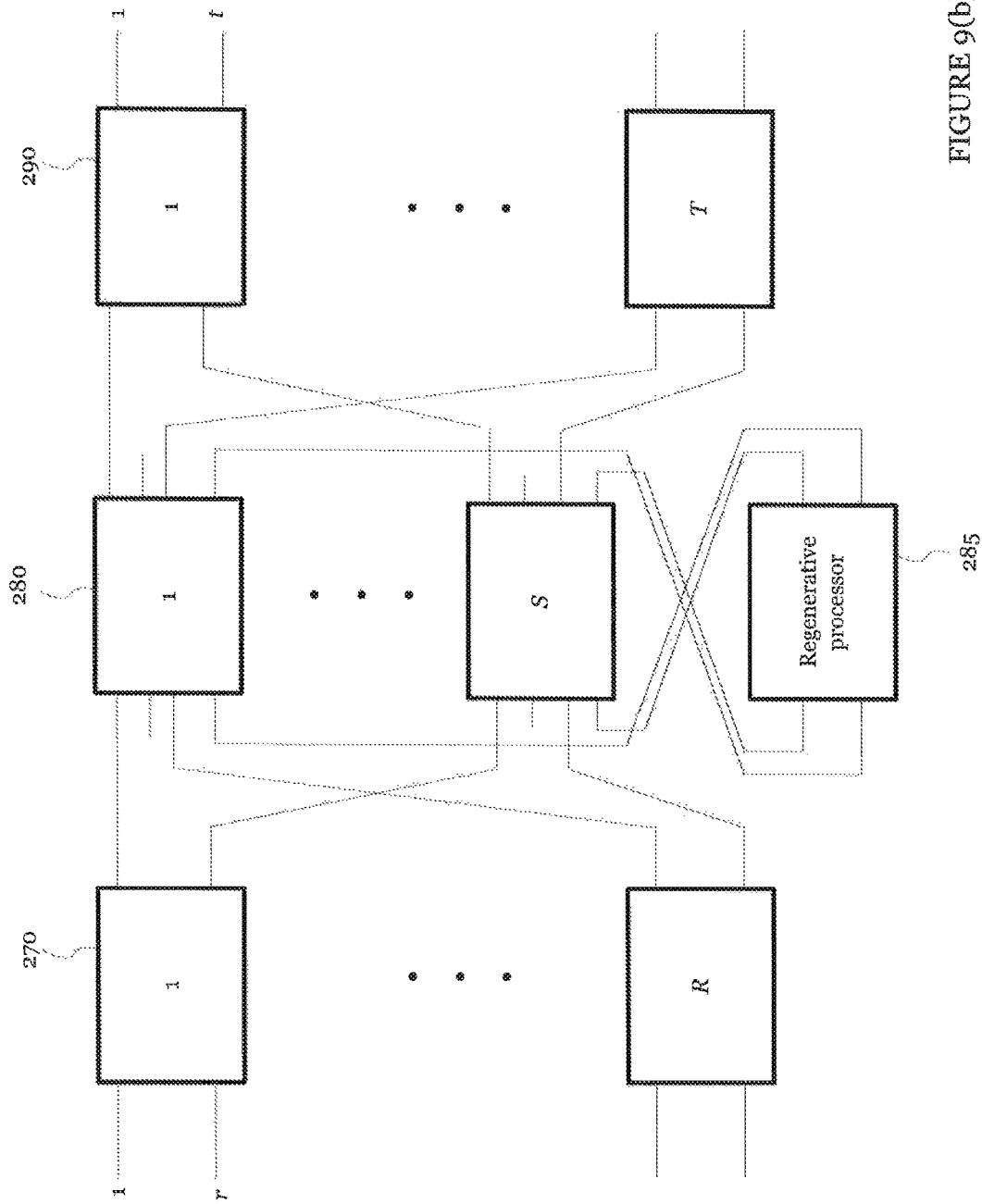

For larger systems with more flexible routing requirements, an architecture such as the one in FIG. 9(b) could be used. Here a subset of the outputs of S middle rank intermediate modules 280 performing switching are connected to the inputs of a regenerative processor 285, which may itself consist of multiple reconfigurable versions of the intermediate modules, and whence the outputs are fed back into spare inputs on the middle rank of intermediate modules. In this way two stages of switching are implemented before and after the regenerative processor, allowing more flexible handling of larger volumes of regenerated traffic. As with FIG. 9(a), there are R input modules 270 and T output modules 290.

Although a number of embodiments have been described with respect to a digital channelizer, this is simply an example of a system which can be constructed using the architecture of the present invention, and alternative systems may be constructed via appropriate configuration of input modules, output modules and intermediate modules.

Methods of testing a digital signal processor formed according to the architecture described above in relation to previous embodiments also fall within the scope of the present invention. The division of the processing functions into physically distinct modules enables a phased testing process to be carried out before the full scale processor is tested. The phased testing may be applied to individual modules, or to groups of modules. If an error is identified in connection with any individual module, it is therefore much quicker to replace or reconfigure this module having identified the error on the basis of an individual test rather than through performing diagnosis of the error through testing of the full scale processor, as would be required in a "single box" solution where the source of the error may be difficult to identify. The advantages of the use of the architecture of the invention are thus apparent.

Testing can be applied prior to use of the digital signal processor, but may also be applied as a routine or scheduled process during use of the processor, namely operational testing. As a result of the test, redundancy can be exploited through routing signals through replacement modules where necessary.

Given the potential to use the architecture of the present invention for space-based applications, the testing which is performed may include environmental testing as well as functional testing, in order to determine whether the on-board processor can withstand the conditions to which it is likely to be exposed on a particular mission, such as severe vibration and acceleration, extremes of temperature, and subjection to high levels of radiation and electromagnetic interference, in orbit or during the launch phase. A phased approach to environmental testing can be particularly valuable both to allow an early retirement of the major risks associated with a test failure and to allow the use of smaller scale test facilities compared to testing a large-scale integrated processor.

It will be appreciated that a number of modifications to the embodiments described may be made which fall within the scope of the invention on account of using the architecture set out in the claims. Compatible features of different embodiments may be combined, as will be apparent to the skilled person, without loss of the generality of the underlying architecture. The scalability of the architecture which has been described can be achieved through appropriate selection of the number of input, intermediate and output modules, the number of ranks of intermediate modules, and the number of intermediate modules within each rank. The fact that each module is "self-contained", or independent, and is typically small in size, connected via high speed cables, enables interchangeability, redundancy and scalability within a particular system, without requiring any modification of the module hardware designs, leading to the possibility of a wide range of applications both within and outside the field of telecommunications.

The invention claimed is:

1. Architecture for implementing digital signal processors, defined by a plurality of physically distinct processors connected by high speed digital interconnections in which:

a first plurality of first signal processors have a plurality of analogue or digital signal inputs and are arranged to perform a first set of digital processing functions and produce a first plurality of digital interconnection outputs;

a second plurality of second signal processors arranged to receive the first plurality of digital interconnection outputs and perform a second set of digital processing functions and produce a second plurality of digital interconnection outputs; and a third plurality of third signal processors arranged to receive the second plurality of digital interconnection outputs and perform a third set of digital processing functions and produce a plurality of analogue or digital signal outputs;

wherein the architecture is scalable by selection of the number of first signal processors, the number of second signal processors and the number of third signal processors and the interconnections between the first, second and third signal processors such that the signal processing required of a digital signal processor is achieved through the distribution of the processing over the combination of the selected numbers of first, second and third signal processors, wherein the number of first signal processors is independent of the number of third signal processors.

2. Architecture according to claim 1, where the first signal processors are arranged to process analogue input signals by performing at least one of: analogue-to-digital conversion, frequency conversion, amplification, filtering, combining, and splitting.

3. Architecture according to claim 1 wherein the third signal processors are arranged to process analogue output signals by performing at least one of: digital-to-analogue conversion, frequency conversion, amplification, filtering, combining, and splitting.

4. Architecture according to claim 1, wherein each of the signal processors is electrically independent and each has its own power supply.

5. Architecture according to claim 1, wherein each of the signal processors is mechanically and thermally independent.

6. Architecture according to claim 1 wherein the number of first signal processors, the number of second signal processors and the number of third signal processors is selected so as to include system redundancy against failure through switching individual signal processors on or off.

7. Architecture according to claim 1 wherein the high speed digital interconnections are serial connections and are electrical or optical methods of communication.

8. Architecture according to claim 1, wherein the first signal processors perform digital channelisation and a first stage of transparent routing on the input signals and the first digital interconnection output signals represent channelised frequency bands of those signals.

9. Architecture according to claim 8, wherein the second signal processors perform transparent routing of the channelised frequency bands.

10. Architecture according to claim 9 wherein the third signal processors perform a final stage of transparent routing and digital recombination of the channelized frequency bands.

11. Architecture according to claim 9 wherein the second signal processors perform digital beamforming of the channelised frequency bands on the digital input signals from an antenna to produce digital output signals representing beams.

12. Architecture according to claim 1 wherein the second signal processors perform a regenerative functions of demodulation, decoding, encoding or modulation.

13. Architecture according to claim 1 wherein the digital processing function is reprogrammable after manufacture.

14. Architecture according to claim 1 wherein control messages are routed along the high speed digital interconnections used to exchange signal data between signal processors.

15. Architecture according to claim 1, wherein control messages are conveyed to or from each signal processor using dedicated control interfaces and means of distribution external to the signal processors.

16. Architecture according to claim 1, in which the first signal processors and/or the second signal processors and/or the third signal processors are arranged in a plurality of sub-groups representing different processing functions.

17. Architecture according to claim 1, wherein the processing signal processors are adapted for mounting on a satellite.

18. Architecture according to claim 1, wherein the first signal processors have a plurality of digital interconnection inputs.

19. Architecture according to claim 1, wherein the third signal processors have a plurality of digital interconnection outputs.

20. A method of testing a digital signal processor formed using the architecture of claim 1, the method comprising:

a phased testing of a plurality of the physically distinct processing signal processors or groups of signal processors, including environmental testing, before final testing of a full scale processor.

21. A method of configuring a digital signal processor using architecture comprising a plurality of physically distinct processing signal processors connected by high speed digital interconnections to combine to perform the processing required of the digital signal processor, the method comprising:

arranging a first plurality of first signal processors, having a plurality of analogue or digital signal inputs, to perform a first set of digital processing functions and produce a first plurality of digital interconnection outputs;

arranging a second plurality of second signal processors to receive the first plurality of digital interconnection outputs and perform a second set of digital processing functions and produce a second plurality of digital interconnection outputs; and arranging a third plurality of third signal processors to receive the second plurality of digital interconnection outputs and perform a third set of digital processing functions and produce a plurality of analogue or digital signal outputs; and scaling the architecture by selecting the number of first signal processors, the number of second signal processors and the number of third signal processors in accordance with the processing required of the digital signal processor, wherein the number of first signal processors is independent of the number of third signal processors.

* * * * *